(12) United States Patent
Cheng et al.

(10) Patent No.: US 10,707,564 B2
(45) Date of Patent: Jul. 7, 2020

(54) UNMANNED AERIAL VEHICLE

(71) Applicant: AUTEL ROBOTICS CO., LTD., Shenzhen, Guangdong (CN)

(72) Inventors: Zhuanpeng Cheng, Guangdong (CN); Shengyuan Li, Guangdong (CN)

(73) Assignee: AUTEL ROBOTICS CO., LTD., Shenzhen, Guangdong (CN)

( * ) Notice: Subject to any disclaimer, the term of this patent is extended or adjusted under 35 U.S.C. 154(b) by 48 days.

(21) Appl. No.: 16/142,619

(22) Filed: Sep. 26, 2018

(65) Prior Publication Data

US 2019/0036203 A1    Jan. 31, 2019

Related U.S. Application Data

(63) Continuation of application No. PCT/CN2016/093082, filed on Aug. 3, 2016.

(30) Foreign Application Priority Data

Apr. 28, 2016    (CN) .................... 2016 2 0374088 U

(51) Int. Cl.
*H01Q 1/28*     (2006.01)
*H01Q 21/24*    (2006.01)
*B64C 39/02*    (2006.01)

(52) U.S. Cl.
CPC .............. *H01Q 1/28* (2013.01); *B64C 39/024* (2013.01); *H01Q 21/24* (2013.01); *B64C 2201/123* (2013.01); *B64C 2201/146* (2013.01)

(58) Field of Classification Search
CPC ................................ H01Q 1/28; H01Q 21/24

USPC ........................................................ 343/705
See application file for complete search history.

(56) References Cited

U.S. PATENT DOCUMENTS

| 5,315,309 A | 5/1994 | Rudow et al. |
| 8,908,573 B1 | 12/2014 | Wang et al. |
| 2009/0069957 A1* | 3/2009 | Nakamura ............. B64D 43/00 701/3 |

FOREIGN PATENT DOCUMENTS

| CN | 102331575 A | 1/2012 |
| CN | 202221473 U | 5/2012 |
| CN | 202405421 U | 8/2012 |
| CN | 103165984 A | 6/2013 |

(Continued)

OTHER PUBLICATIONS

European Search Report completed Jan. 9, 2019; Appln. No. EP 16 90 0063.

*Primary Examiner* — Andrea Lindgren Baltzell

(57) ABSTRACT

The present disclosure relates to the technical field of unmanned aerial vehicles, and in particular, to an unmanned aerial vehicle. The unmanned aerial vehicle includes at least a first dual-polarized antenna and a second dual-polarized antenna, wherein the first dual-polarized antenna is provided in a horizontal direction of the unmanned aerial vehicle, and the second dual-polarized antenna is provided in a vertical direction of the unmanned aerial vehicle. As the antenna designed in this structure is applied to the unmanned aerial vehicle of the present application, a weak signal in a vertical polarization direction is compensated by a strong electromagnetic signal in a horizontal polarization direction, and therefore an image transmission height of the unmanned aerial vehicle is increased in the vertical direction.

12 Claims, 4 Drawing Sheets

(56) References Cited

FOREIGN PATENT DOCUMENTS

| CN | 104134861 A | 11/2014 |
|----|-------------|---------|
| CN | 203921192 U | 11/2014 |

\* cited by examiner

UNMANNED AERIAL VEHICLE

CROSS-REFERENCE

This application is a continuation application of International Application No. PCT/CN2016/093082, filed on Aug. 3, 2016, which claims priority of Chinese Patent Application No. 201620374088.8, filed on Apr. 28, 2016, which is incorporated herein by reference in its entirety.

BACKGROUND

Technical Field

The present disclosure relates to the technical field of unmanned aerial vehicles, and in particular, to an unmanned aerial vehicle.

Related Art

An unmanned aerial vehicle is an unmanned airplane that is controlled by a radio remote device. When the unmanned aerial vehicle is remotely controlled, since one antenna of the unmanned aerial vehicle is used at a source end, and another antenna of the unmanned aerial vehicle is used in a remote device, in some cases, such design causes a problem of a multipath effect. When an electromagnetic field runs into an obstacle such as a mountain peak, a canyon, a building, or a facility lines, the wavefront of the electromagnetic is dispersed, and consequently the electromagnetic wave would reach the destination along multiple paths. The latecomers among the scattered signals cause problems such as attenuation, patterns (cliff effect), intermittent reception (picket fence) and so on. In a digital communications system such as wireless Internet, this would reduce the speed of data transmission and increases errors in data transmission.

In an implementation process of the present disclosure, the applicant finds that there are the following problems in the prior art: the height of the image transmission in vertical direction of an existing unmanned aerial vehicle is limited, that is, its flight height is limited.

SUMMARY

To resolve the foregoing technical problems, an objective of the present disclosure is to provide an unmanned aerial vehicle, to resolve the problem that a flight height of an existing unmanned aerial vehicle is excessively low in a vertical direction.

To resolve the foregoing technical problems, embodiments of the present disclosure provide an unmanned aerial vehicle, including at least a first dual-polarized antenna and a second dual-polarized antenna. The first dual-polarized antenna is provided in a horizontal direction of the unmanned aerial vehicle, and the second dual-polarized antenna is provided in a vertical direction of the unmanned aerial vehicle.

Optionally, the unmanned aerial vehicle includes a body, and a first foot stand and a second foot stand disposed on two sides of the body, oppositely to each other;

the first dual-polarized antenna is horizontally provided in the first foot stand; and the second dual-polarized antenna is vertically provided in the second foot stand.

Optionally, the unmanned aerial vehicle includes a body, and a first foot stand and a second foot stand disposed below the body, oppositely to each other; and the first foot stand includes a first connection rack, a second connection rack, and a third connection rack, wherein the first connection rack, the second connection rack, and the third connection rack are sequentially connected, and wherein the first dual-polarized antenna is horizontally provided in the second connection rack, and the second dual-polarized antenna is vertically provided in the first connection rack or the third connection rack.

Optionally, several first limit columns are provided inside the first foot stand at intervals along an outline that defines the shape of the first foot stand, so as to limit the first dual-polarized antenna.

Optionally, the first dual-polarized antenna includes a first copper pipe and a first radio frequency cable;

one end of the first radio frequency cable is provided with a first radio frequency connector, and the other end of the first radio frequency cable is provided inside the first copper pipe; and one end of the first copper pipe is provided with a first soldering tin pad, and the other end of the first radio frequency cable is provided with a second soldering tin pad; wherein a core cable of the first radio frequency cable passes through one end of the first copper pipe, and connects the core cable of the first radio frequency cable and the first copper pipe by the welding between the first soldering tin pad and the second soldering tin pad.

Optionally, the first dual-polarized antenna further includes a first heat-shrinkable sleeve, wherein the first copper pipe and the first radio frequency cable are both provided inside the first heat-shrinkable sleeve.

Optionally, the diameter of the core cable of the first radio frequency cable is 1.37 mm.

Optionally, several second limit columns are provided inside the second foot stand at intervals along an outline that defines the shape of the second foot stand, so as to limit the second dual-polarized antenna.

Optionally, the second dual-polarized antenna includes a second copper pipe and a second radio frequency cable;

one end of the second radio frequency cable is provided with a second radio frequency connector, and the other end of the second radio frequency cable is provided inside the second copper pipe; and one end of the second copper pipe is provided with a third soldering tin pad, and the other end of the second radio frequency cable is provided with a fourth soldering tin pad; wherein a core cable of the second radio frequency cable passes through one end of the second copper pipe, and connects the core cable of the second radio frequency cable and the first copper pipe by the welding between the third soldering tin pad and the fourth soldering tin pad.

Optionally, the second dual-polarized antenna further includes a second heat-shrinkable sleeve, wherein the second copper pipe and the second radio frequency cable are both provided inside the second heat-shrinkable sleeve.

In the embodiments of the present disclosure, by providing at least one first dual-polarized antenna in a direction parallel of the horizontal plane, and providing at least one second dual-polarized antenna in a direction perpendicular of the horizontal plane. Applied the design of this antenna structure, the unmanned aerial vehicle of this embodiment, a weak signal in a vertical polarization direction is compensated by a strong electromagnetic signal in a horizontal polarization direction, and therefore an image transmission height of the unmanned aerial vehicle is increased in the vertical direction.

DETAILED DESCRIPTION

Figure 1:
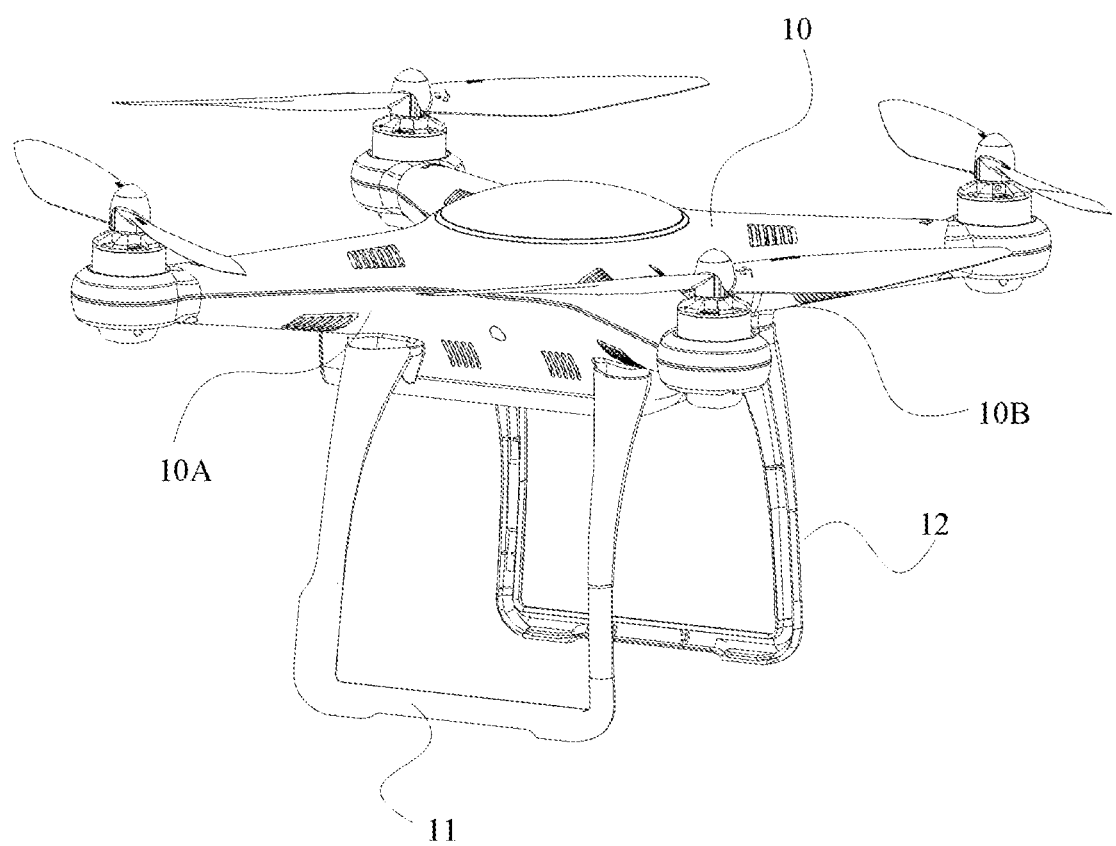
FIG. 1 is a schematic structural diagram of an unmanned aerial vehicle according to an embodiment of the present disclosure.

For ease of understanding the present disclosure, the following describes the present disclosure in further detail with reference to accompanying drawings and specific implementations. It should be noted that, when an element is described as "being fixed on" another element, the element may be directly on the another element, or there may be one or more elements therebetween. When an element is described as "being connected to" another element, the element may be directly connected to another element, or there may be one or more elements therebetween. Terms such as "vertical", "horizontal", "left", "right", and similar descriptions provided in the specification are only for description purposes only.

All technical and scientific terms used in the specification have the same common meanings that are understood by a person skilled in the technical field of the present disclosure, unless otherwise defined. Terms used in the specification of the present disclosure are only for describing specific implementations, and are not for limiting the present disclosure. The term "and/or" used in the specification includes any and all combinations of one or more related items listed.

For ease of describing and understanding the technical solutions of the present disclosure, orientation terms used in the following descriptions are based on orientations shown in the accompanying drawings.

Embodiment 1

In this embodiment, the unmanned aerial vehicle includes an unmanned fixed wing vehicle, an unmanned vertical takeoff and landing aircraft, an unmanned multi-rotor aerial vehicle, and an unmanned paraplane. The unmanned aerial vehicle may preferably include an unmanned airship and an unmanned helicopter. In this embodiment, the unmanned aerial vehicle may include only a rotor wing, and a body that generates power and receives or sends a control signal, or may include a rotor wing, a body that generates power and receives or sends a control signal, and a foot stand.

In a horizontal direction of the unmanned aerial vehicle, the unmanned aerial vehicle of this embodiment is provided with at least one first dual-polarized antenna. In a vertical direction of the unmanned aerial vehicle, the unmanned aerial vehicle of this embodiment is provided with at least one second dual-polarized antenna. Herein, positions at which the first dual-polarized antenna and the second dual-polarized antenna are provided in the unmanned aerial vehicle are not specifically limited, as long as the position of the first dual-polarized antenna is in the horizontal direction of the unmanned aerial vehicle, and the second dual-polarized antenna is in the vertical direction of the unmanned aerial vehicle. For example, the first dual-polarized antenna and the second dual-polarized antenna may be provided inside the body of the unmanned aerial vehicle, may be provided in an additional device for providing a dual-polarized antenna in the unmanned aerial vehicle, or may be provided in another flying device for assisting the unmanned aerial vehicle.

In this embodiment, to obtain an image transmission signal of a higher distance, horizontal polarization is combined with original single vertical polarization, so that a signal with very low gains in an original vertical polarization directivity pattern is compensated by a strongest electromagnetic signal in a horizontal polarization directivity pattern, and a gain value increases from the original −20 dBi to 2 dBi. When an external antenna of a remote control is horizontally disposed, a power capacity of a horizontal polarization image transmission signal received by the antenna becomes very high. Therefore, in this embodiment, in a flight process in a vertical direction, a flight height of the unmanned aerial vehicle far exceeds a vertical flight height in an antenna vertical polarization state.

In this embodiment, quantities of the first dual-polarized antennas and the second dual-polarized antennas provided in the unmanned aerial vehicle are not limited to one, and a designer may provide multiple first dual-polarized antennas and multiple second dual-polarized antennas according to the size, a performance requirement, and an operation objective and environment of the unmanned aerial vehicle. The multiple first dual-polarized antennas and the multiple second dual-polarized antennas provided help increase a horizontal flight distance and a vertical flight height of the unmanned aerial vehicle.

Referring to FIG. 1, FIG. 1 is a schematic structural diagram of an unmanned aerial vehicle according to Embodiment 1 of the present disclosure. As shown in FIG. 1, in this embodiment, the unmanned aerial vehicle is a four-rotor unmanned aerial vehicle, and works in a MIMO mode. A MIMO antenna indicates multiple-input and multiple-output, and is usually used in IEEE 802.11n but is also applicable to other 802.11 technologies.

MIMO technologies may be approximately divided into two types: transmit/receive diversity and spatial multiplexing. A MIMO antenna is sometimes referred to as spatial diversity because the MIMO antenna transmits and receives data by using multiple spatial paths, and MIMO technologies can improve a channel capacity. Therefore, in this embodiment, channels and capacities of signals received or sent by the unmanned aerial vehicle are large, which helps increase a flight height of the unmanned aerial vehicle and conveniently control the unmanned aerial vehicle.

The unmanned aerial vehicle includes a body 10, a first foot stand 11, and a second foot stand 12. The first foot stand 11 is provided on a first side surface 10A of the body 10, and the second foot stand 12 is provided in a second side surface 10B of the body 10.

Figure 2:
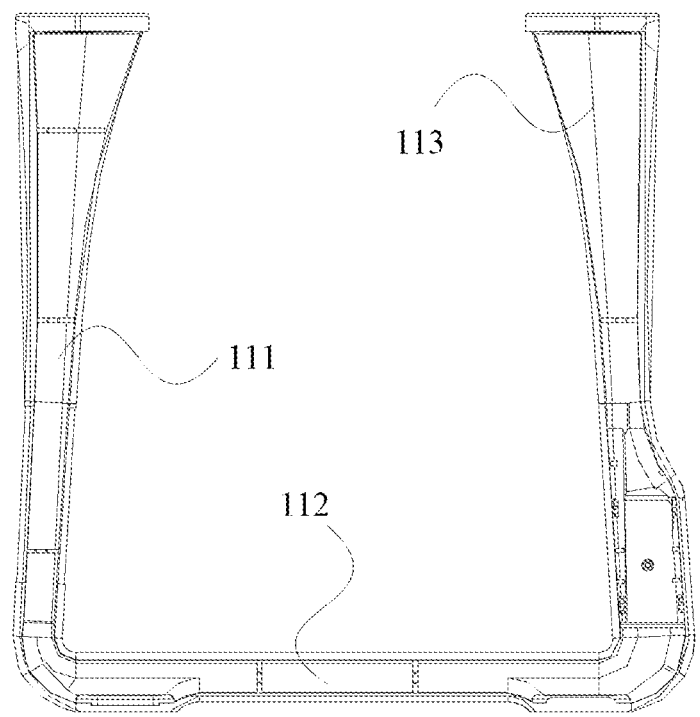
FIG. 2 is a schematic structural solid diagram of a first foot stand according to an embodiment of the present disclosure.

Referring to FIG. 2, FIG. 2 is a structural solid diagram of a first foot stand according to Embodiment 1 of the present disclosure. As shown in FIG. 2, the first foot stand 11 includes three connection racks. When the first foot stand 11 is assembled on the body 10, one end of a first connection rack 111 is connected to the body 10, one end of a third connection rack 113 is connected to the body 10, the other end of the first connection rack 111 is connected to one end of a second connection rack 112, and the other end of the second connection rack 112 is connected to the other end of the third connection rack 113. Each connection rack is made of a highly hard material.

In this embodiment, the connection racks are integrally connected, and the first foot stand is formed by die casting each connection rack once. By using integral connection, the unmanned aerial vehicle can land on the ground more stably. Certainly, herein, the connection racks may alternatively be separately connected, and are not limited to integral connection.

In this embodiment, the second foot stand includes a fourth connection rack, a fifth connection rack, and a sixth connection rack, and the fourth connection rack, the fifth connection rack, and the sixth connection rack are sequentially connected. The second foot stand and the first foot stand have the same overall structures, and details are not described herein.

Figure 3:
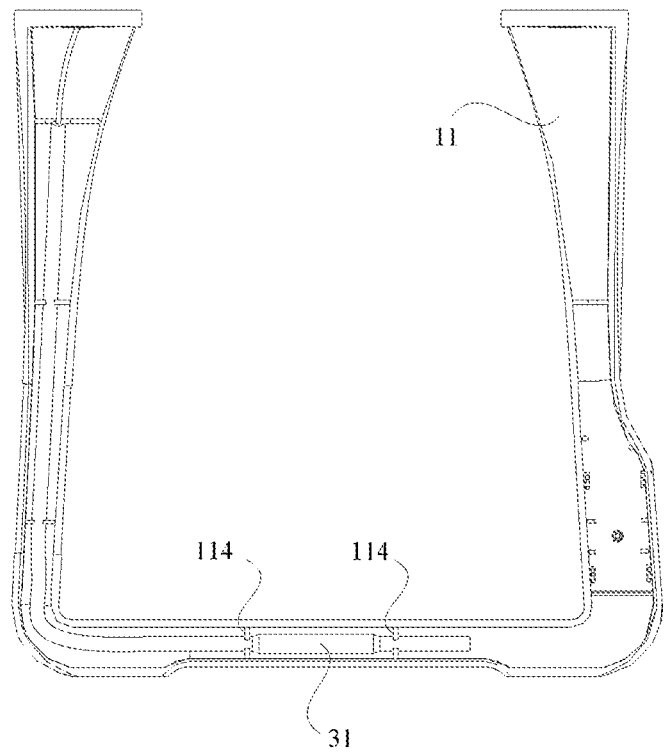
FIG. 3 is a schematic structural diagram in which a first dual-polarized antenna is provided inside a first foot stand according to an embodiment of the present disclosure.
Figure 4:
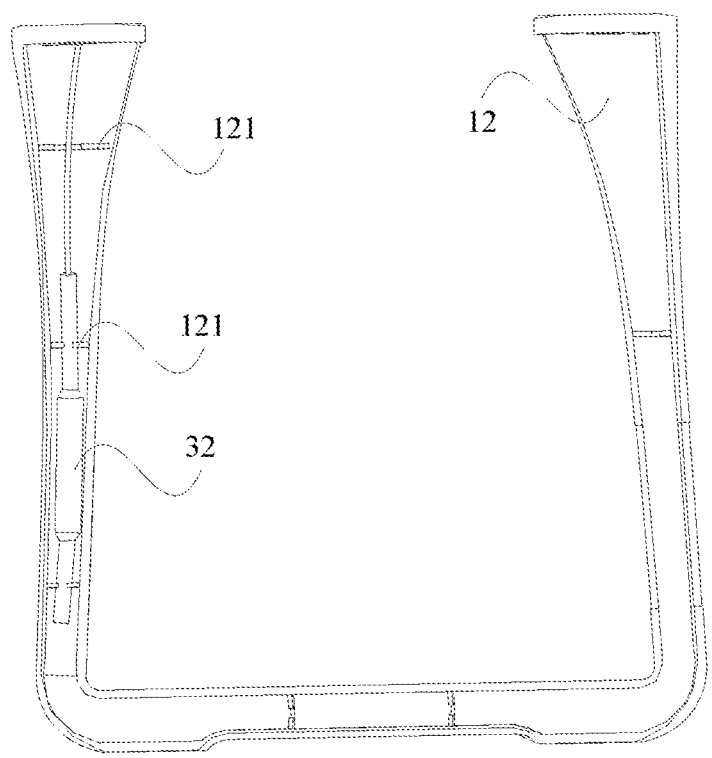
FIG. 4 is a schematic structural diagram in which a second dual-polarized antenna is provided inside a second foot stand according to an embodiment of the present disclosure.

Referring to both FIG. 3 and FIG. 4, FIG. 3 is a schematic structural diagram in which a first dual-polarized antenna is provided inside a first foot stand according to Embodiment 1 of the present disclosure; and FIG. 4 is a schematic structural diagram in which a second dual-polarized antenna is provided inside a second foot stand according to Embodiment 1 of the present disclosure. As shown in FIG. 3 and FIG. 4, optionally, in this embodiment, in a direction parallel to a horizontal plane, the first dual-polarized antenna 31 is provided in the first foot stand 11, and in a direction perpendicular to the horizontal plane, the second dual-polarized antenna 32 is provided in the second foot stand 12.

The dual-polarized antenna is respectively provided in the first foot stand 11 or the second foot stand 12. On one hand, this can fully use unoccupied space of the foot stand, and on the other hand, this can avoid a problem that because the dual-polarized antenna is provided in the body, aesthetic appeal of an external structure design of the body is reduced.

The body 10 includes a signal receiving circuit and a signal sending circuit. Each dual-polarized antenna is respectively electrically connected to the signal receiving circuit and the signal sending circuit. The signal receiving circuit receives a signal fed by the antenna and processes the signal, and the signal sending circuit sends the signal by using the antenna.

As shown in FIG. 3, in this embodiment, several first limit columns 114 are provided inside the first foot stand 11 at intervals along an outline that defines the shape of the first foot stand 11. After the first dual-polarized antenna 31 is assembled in the first foot stand 11, the first limit column 114 limits the first dual-polarized antenna 31, to avoid a problem that in a flight process of the unmanned aerial vehicle, the first foot stand 11 shakes and consequently the first dual-polarized antenna 31 moves.

Figure 5:
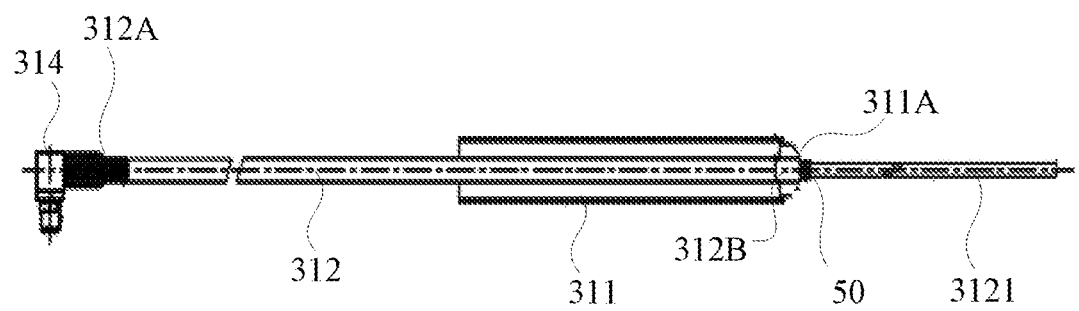
FIG. 5 is a schematic structural diagram in which a first dual-polarized antenna is hidden behind a heat-shrinkable sleeve according to an embodiment of the present disclosure.
Figure 6:
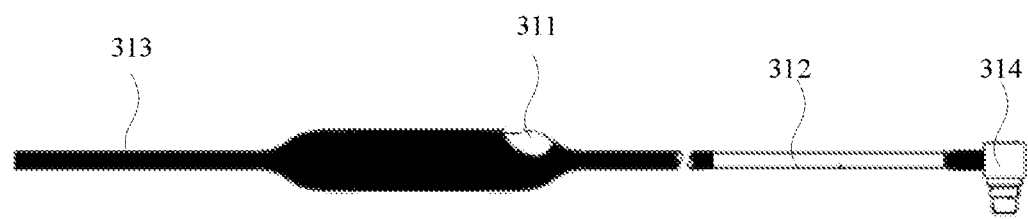
FIG. 6 is a schematic structural diagram in which a first dual-polarized antenna is sleeved behind a heat-shrinkable sleeve according to an embodiment of the present disclosure.

Referring to both FIG. 5 and FIG. 6, FIG. 5 is a schematic structural diagram in which a first dual-polarized antenna is hidden behind a heat-shrinkable sleeve according to an embodiment of the present disclosure; and FIG. 6 is a schematic structural diagram in which a first dual-polarized antenna is sleeved behind a heat-shrinkable sleeve according to an embodiment of the present disclosure. As shown in FIG. 5 and FIG. 6, the first dual-polarized antenna 31 includes a first copper pipe 311, a first radio frequency cable 312, and a first heat-shrinkable sleeve 313. One end 312A of the first radio frequency cable 312 is provided with a first radio frequency connector 314, the other end 312B of the first radio frequency cable 312 is provided in the first copper pipe 311, one end 311A of the first copper pipe 311 is provided with a first soldering tin pad (not shown in the figure), and the other end 312B of the first radio frequency cable 312 is provided with a second soldering tin pad (not shown in the figure). In this embodiment, the first radio frequency cable 312 includes a core cable 3121 and an external shield layer enclosing the core cable. Optionally, in this embodiment, the diameter of the core cable 3121 of the first radio frequency cable 312 is 1.37 mm.

The core cable 3121 of the first radio frequency cable 312 passes through one end 311A of the first copper pipe 311, and a welding portion 50 is formed by the welding between the first soldering tin pad and the second soldering tin pad. The core cable 3121 of the first radio frequency cable 312 and the first copper pipe 311 are connected by the welding herein.

In this embodiment, an MMCX radio frequency connector is used as the first radio frequency connector 314. Certainly, another radio frequency connector may be also used as the first radio frequency connector 314 herein.

In this embodiment, the first copper pipe 311 and the first radio frequency cable 312 are both provided in the first heat-shrinkable sleeve 313. The first heat-shrinkable sleeve 313 is used to protect the first dual-polarized antenna 31 and avoid that the unmanned aerial vehicle shakes in a flight process and consequently the first dual-polarized antenna 31 is damaged.

As shown in FIG. 4, in this embodiment, several second limit columns 121 are provided inside the second foot stand 12 at intervals along an outline that defines the shape of the second foot stand 12. After the second dual-polarized antenna 32 is assembled in the second foot stand 12, the second limit column 121 limits the second dual-polarized antenna 32, to avoid a problem that in a flight process of the unmanned aerial vehicle, the second foot stand 12 shakes and the second dual-polarized antenna 32 moves.

Figure 7:
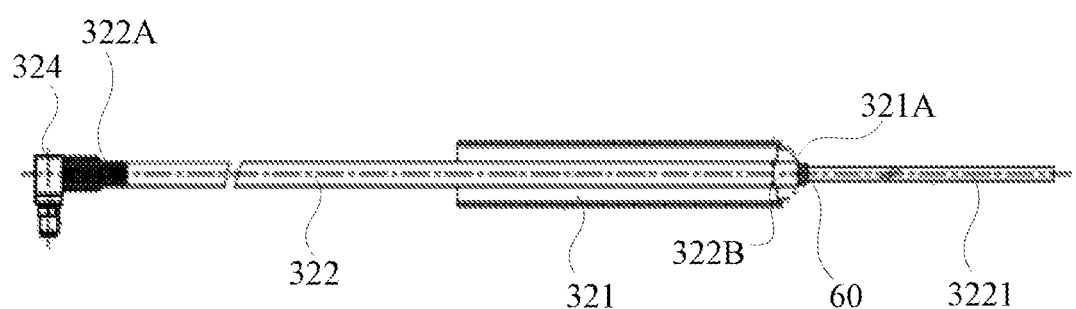
FIG. 7 is a schematic structural diagram in which a second dual-polarized antenna is hidden behind a heat-shrinkable sleeve according to an embodiment of the present disclosure.
Figure 8:
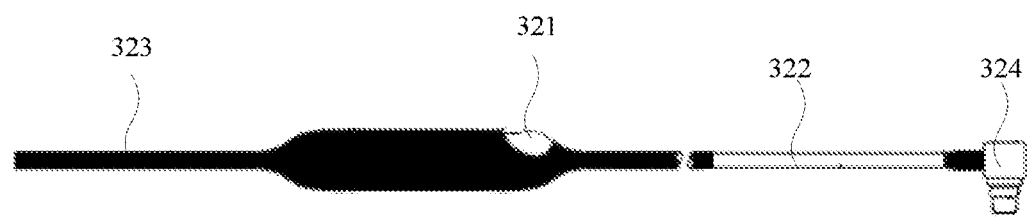
FIG. 8 is a schematic structural diagram in which a second dual-polarized antenna is sleeved behind a heat-shrinkable sleeve according to an embodiment of the present disclosure.

Referring to both FIG. 7 and FIG. 8, FIG. 7 is a schematic structural diagram in which a second dual-polarized antenna is hidden behind a heat-shrinkable sleeve according to an embodiment of the present disclosure; and FIG. 8 is a schematic structural diagram in which a second dual-polarized antenna is sleeved behind a heat-shrinkable sleeve according to an embodiment of the present disclosure. As shown in FIG. 7 and FIG. 8, the second dual-polarized antenna 32 includes a second copper pipe 321, a second radio frequency cable 322, and a second heat-shrinkable sleeve 323. One end 322A of the second radio frequency cable 322 is provided with a second radio frequency connector 324, the other end 322B of the second radio frequency cable 322 is provided in the second copper pipe 321, one end 321A of the second copper pipe 321 is provided with a third soldering tin pad (not shown in the figure), and the other end 322B of the second radio frequency cable 322 is provided with a fourth soldering tin pad (not shown in the figure). In this embodiment, the second radio frequency cable 322 includes a core cable 3221 and an external shield layer enclosing the core cable. Optionally, in this embodiment, the diameter of the core cable 3221 of the second radio frequency cable 322 is 1.37 mm.

The core cable 3221 of the second radio frequency cable 322 passes through one end 321A of the second copper pipe 321, and a solder portion 60 is formed by welding between the third soldering tin pad and the fourth soldering tin pad. The core cable 3221 of the second radio frequency cable 322 and the second copper pipe 321 are connected by welding herein.

In this embodiment, an MMCX radio frequency connector is used as the second radio frequency connector 324. Certainly, another radio frequency connector may be also used as the second radio frequency connector 324 herein.

In this embodiment, the second copper pipe 321 and the second radio frequency cable 322 are both provided in the second heat-shrinkable sleeve 323. The second heat-shrinkable sleeve 323 is used to protect the second dual-polarized antenna 32 and avoid that the unmanned aerial vehicle shakes in a flight process and consequently the second dual-polarized antenna 32 is damaged.

In this embodiment, coaxial antennas are used as the first dual-polarized antenna 31 and the second dual-polarized antenna 32, and are characterized by small sizes, light weights, simple structures, low costs, easy integration, and the like.

Embodiment 2

A difference between this embodiment and Embodiment 1 is as follows: referring to FIG. 2 again, the first dual-polarized antenna 31 is horizontally provided in the second connection rack 112 of the first foot stand 11, and the second dual-polarized antenna 32 is vertically provided in the first connection rack 111 or the third connection rack 113 of the first foot stand 11. On one hand, this structural design helps increase a horizontal flight distance and a vertical flight height of the unmanned aerial vehicle, and on the other hand, can save design space.

Embodiment 3

A difference between this embodiment and Embodiment 1 or Embodiment 2 is as follows: The first dual-polarized antenna 31 is horizontally provided in a fifth connection rack of the second foot stand, and the second dual-polarized antenna 31 is vertically provided in a fourth connection rack or a sixth connection rack of the second foot stand. On one hand, this structural design helps increase a horizontal flight distance and a vertical flight height of the unmanned aerial vehicle, and on the other hand, can save design space.

In the foregoing embodiments, specific implementations of the embodiments may be combined with each other, and details are not described herein.

The foregoing descriptions are merely preferred embodiments of the present disclosure, but are not intended to limit the present disclosure. Any modification, equivalent replacement, or improvement made without departing from the spirit and principle of the present disclosure should fall within the protection scope of the present disclosure.

What is claimed is:

1. An unmanned aerial vehicle, including at least a first dual-polarized antenna and a second dual-polarized antenna, wherein the first dual-polarized antenna is provided in a horizontal direction of the unmanned aerial vehicle, and the second dual-polarized antenna is provided in a vertical direction of the unmanned aerial vehicle; wherein the horizontal direction of the unmanned aerial vehicle is perpendicular to the vertical direction of the unmanned aerial vehicle.

2. The unmanned aerial vehicle according to claim 1, wherein
the unmanned aerial vehicle includes a body, and a first foot stand and a second foot stand disposed below the body, oppositely to each other;
the first dual-polarized antenna is horizontally provided in the first foot stand; and
the second dual-polarized antenna is vertically provided in the second foot stand.

3. The unmanned aerial vehicle according to claim 1, wherein
the unmanned aerial vehicle includes a body, and a first foot stand and a second foot stand, disposed below the body, oppositely to each other; and
the first foot stand includes a first connection rack, a second connection rack, and a third connection rack, wherein the first connection rack, the second connection rack, and the third connection rack are sequentially connected, and wherein the first dual-polarized antenna is horizontally provided in the second connection rack, and the second dual-polarized antenna is vertically provided in the first connection rack or the third connection rack.

4. The unmanned aerial vehicle according to claim 2, wherein several first limit columns are provided inside the first foot stand at intervals along an outline that defines the shape of the first foot stand, so as to limit the first dual-polarized antenna.

5. The unmanned aerial vehicle according to claim 3, wherein several first limit columns are provided inside the first foot rest at intervals along an outline that defines the shape of the first foot rest, to locate the first dual-polarized antenna.

6. The unmanned aerial vehicle according to claim 1, wherein the first dual-polarized antenna includes a first copper pipe and a first radio frequency cable;
one end of the first radio frequency cable is provided with a first radio frequency connector, and the other end of the first radio frequency cable is provided inside the first copper pipe; and
one end of the first copper pipe is provided with a first soldering tin pad, and the other end of the first radio frequency cable is provided with a second soldering tin pad; wherein a core cable of the first radio frequency cable passes through one end of the first copper pipe, and connects the core cable of the first radio frequency cable and the first copper pipe by the welding between the first soldering tin pad and the second soldering tin pad.

7. The unmanned aerial vehicle according to claim 6, wherein the first dual-polarized antenna further includes a first heat-shrinkable sleeve, wherein the first copper pipe and the first radio frequency cable are both provided inside the first heat-shrinkable sleeve.

8. The unmanned aerial vehicle according to claim 7, wherein the diameter of the core cable of the first radio frequency cable is 1.37 mm.

9. The unmanned aerial vehicle according to claim 2, wherein several second limit columns are provided inside the second foot stand at intervals along an outline that defines the shape of the second foot stand, so as to limit the second dual-polarized antenna.

10. The unmanned aerial vehicle according to claim 3, wherein several second limit columns are provided inside the second foot stand at intervals along an outline that defines the shape of the second foot stand, so as to limit the second dual-polarized antenna.

11. The unmanned aerial vehicle according to claim 1, wherein the second dual-polarized antenna includes a second copper pipe and a second radio frequency cable;
- one end of the second radio frequency cable is provided with a second radio frequency connector, and the other end of the second radio frequency cable is provided inside the second copper pipe; and
- one end of the second copper pipe is provided with a third soldering tin pad, and the other end of the second radio frequency cable is provided with a fourth soldering tin pad; wherein a core cable of the second radio frequency cable passes through one end of the second copper pipe, and connects the core cable of the second radio frequency cable and the first copper pipe by the welding between the third soldering tin pad and the fourth soldering tin pad.

12. The unmanned aerial vehicle according to claim 11, wherein the second dual-polarized antenna further includes a second heat-shrinkable sleeve, wherein the second copper pipe and the second radio frequency cable are both provided inside the second heat-shrinkable sleeve.

\* \* \* \* \*